Figure 1:
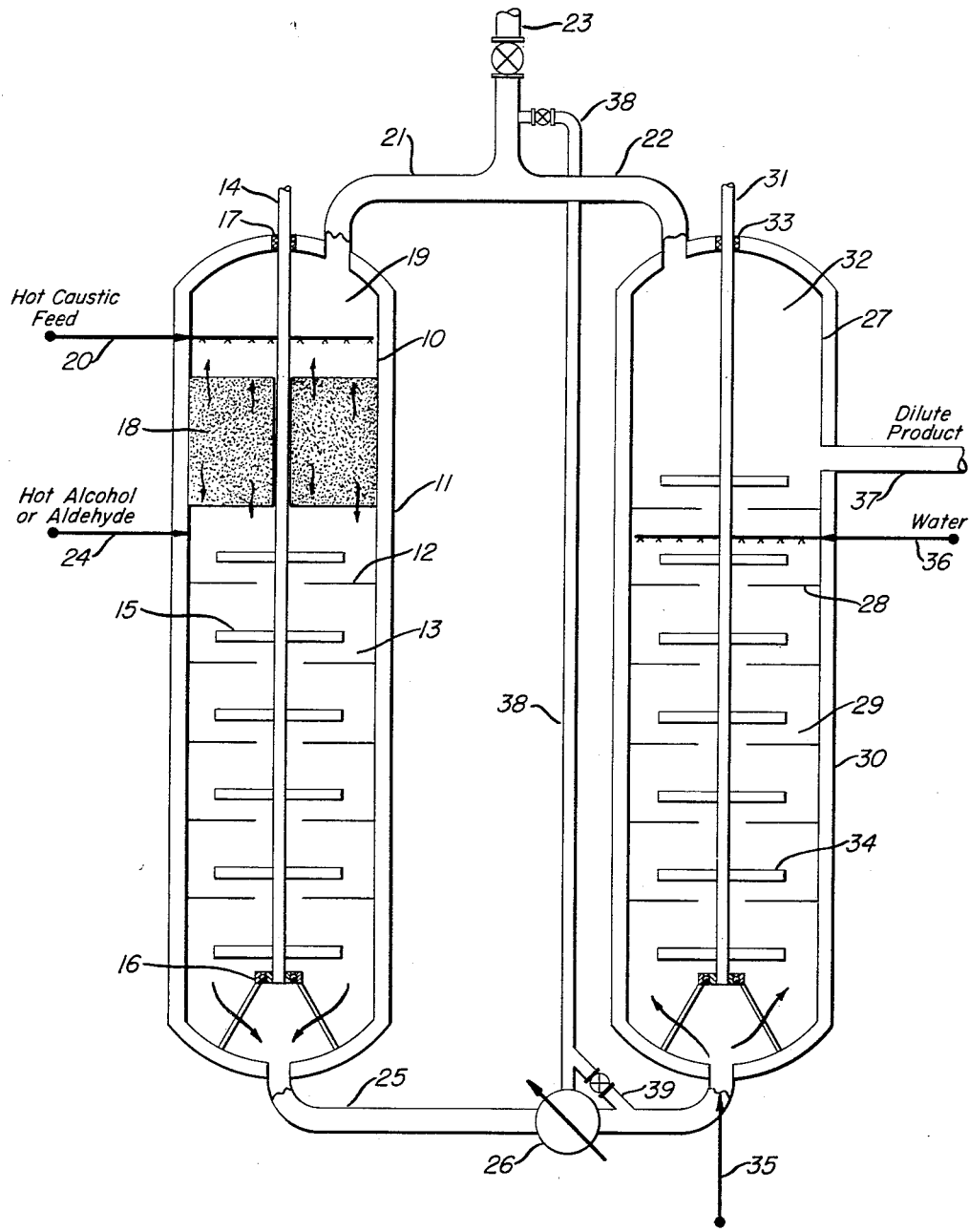

Dec. 13, 1955  M. SUTTON  2,727,050
CAUSTIC OXIDATION OF ALCOHOLS AND ALDEHYDES
Filed Nov. 19, 1952  2 Sheets-Sheet 1

INVENTOR.
Mack Sutton
BY
Olin E. Williams
ATTORNEY

United States Patent Office 2,727,050
Patented Dec. 13, 1955

2,727,050

CAUSTIC OXIDATION OF ALCOHOLS AND ALDEHYDES

Mack Sutton, Valparaiso, Ind., assignor to Standard Oil Company, Chicago, Ill., a corporation of Indiana Application November 19, 1952, Serial No. 321,341

10 Claims. (Cl. 260—413)

This invention relates to method and means for reacting liquids in which reaction a gas is evolved, and has particular reference to improvements in method and means for effecting the caustic oxidation of alcohols and aldehydes.

A primary object of this invention is the provision of improved method and means for reacting liquids which evolve a gas during reaction and particularly which form a viscous liquid reaction product. Another object of the invention is the provision of an improved method and means for the caustic oxidation of alcohols and aldehydes, particularly those having between about 4 to 16 carbon atoms per molecule, to form the corresponding soap and organic acid. A further object of the invention is the provision of improved reactor apparatus whereby substantially complete reaction is obtained in a single pass and losses of volatile reactants are kept to a minimum. The invention has for further objects such other advantages and results as will be found to obtain in the specification and in the claims hereinafter made.

Briefly stated, the present invention comprises an improved method and means of reacting liquids in which one liquid is introduced at the top of a vertically extending reactor column or tower and flows down over a packed section disposed within the upper zone of the said column and countercurrent to rising vapors, including a product gas and vapors of a liquid reactant and in which method and means a second reactant liquid is introduced into the column at a point beneath the said packed section and mixes with downflowing first liquid reactant. The method and means are characterized in that the major portion of the gas liberated by reaction between the liquids is released in the upper section of a body of liquid in the tower so that stripping of volatile reactant liquid from the reaction mixture is reduced to a minimum. Only a minor portion of the gas is released during subsequent passage of the reaction mixture down through the column thus providing a tower having maximum liquid reaction space relative to tower volume. Partially reacted reaction mixture is removed from the bottom of the tower and is introduced into the bottom of a second column or tower where the reaction is completed. A fluidizing liquid, such as water, is introduced near the top of the body of liquid in the second tower to render the product less viscous thus to facilitate discharge of product therefrom and to promote release of the remaining product gas into a vapor space which is vented at the top of the second tower. Each of the reactors will, preferably, contain a tier of communicating reactor chambers in the lower section of each column. The chambers are formed preferably by a series of horizontal baffles each having a passageway for liquids to flow therebetween. The tier of reaction chambers in the first reactor column is disposed just beneath the point at which the second reactor liquid is introduced and extends to substantially the bottom of the column. The tier of reaction chambers in the second column is disposed beneath a vapor-separating zone and a liquid outlet and extends to substantially the bottom of the column. The reactor columns are, preferably, each supplied with agitator means of which a preferred embodiment is a series of blades extending into each of the said reactor chambers and propelled by a vertical shaft extending through the passageways between the said baffles.

With particular reference to the caustic oxidation of alcohols and aldehydes, the invention comprises an improved method and means in which preheated caustic is introduced through a liquid inlet near the top of a reactor column that is equipped with a packed section disposed just below the liquid inlet, a tier of communicating reactor chambers extending from a point beneath the said packed section to substantially the bottom of the column, a second inlet through which a preheated alcohol or aldehyde is introduced into the column, and a stirring apparatus associated with the said tier of communicating chambers to agitate the mixture of caustic and alcohol and/or aldehydes in the chambers. The preheated hot caustic while flowing down through the said packed section will scrub volatile alcohol and/or aldehydes from effluent gases and will in turn be concentrated by the vaporizing action of the rising column of vapors so that a commercial grade of caustic solution can be concentrated to as high as 95% before admixture with the alcohol or aldehydes. The major portion of hydrogen product gas liberated by the oxidation reaction in the reactor column is released near the surface of the body of liquid in the said column so that the stripping of reactant liquid is reduced to a minimum. Partially oxidized mixture comprising predominantly reaction product and some unreacted alcohol and/or aldehyde is removed from the bottom of the said column and is introduced into the base of a second column also having a stirrer and a tier of communicating reacting chambers. The reaction mixture, now containing a viscous soap product, rises through the tier of chambers and is rendered flowable by the evolution of the final quantities of hydrogen and in some cases by the addition of a fluidizing liquid such as water. At some point near the top of this second tier of chambers an additional quantity of fluidizing liquid, preferably water, is added to the product to render the same still more flowable, thus permitting ready passage of the product through a liquid outlet and release of residual hydrogen into a vapor space at the top of the column. Evolved hydrogen in both the first and second reactor columns escapes through vents at the top of each column.

A primary source of feed stock for the caustic oxidation process is the Oxo synthesis in which carbon monoxide, hydrogen, and an olefin are reacted, usually in the presence of cobalt catalyst, at elevated temperatures and pressures to provide an aldehydic product having one more carbon atom than the employed olefin which product can be hydrogenated to provide an alcohol. The olefinic hydrocarbons in turn may be obtained in substantial quantities from petroleum catalytic-cracking operations. Typical olefins are pentenes, hexenes, heptenes and octenes from which are obtained the corresponding $C_6$ to $C_9$ Oxo aldehydes and Oxo alcohols for the manufacture of caustic soaps.

The oxidation reaction employed in the present method is performed usually under a pressure between atmospheric and 500 p. s. i. g., and preferably at about 200 p. s. i. g., and at a temperature between 175° and about 380° C. When a mixture of aldehydes and alcohols is oxidized, I have found that yield and quality of soap product is improved by first oxidizing under relatively anhydrous conditions at a low temperature within the range set forth above, e. g., about 200° C., so as to oxidize aldehydes at their optimum temperature, and then increasing the temperature to within the upper half of the said range, for example, about 360° C., preferably with the addition of a small amount of water, so as to oxidize alcohols under optimum conditions for this reaction.

The caustic employed in the oxidation of alcohols and aldehydes can be either an oxide or hydroxide of an alkali metal, or alkaline earth metal, but is preferably an alkali metal hydroxide. The apparatus of the present invention is particularly designed to effect intimate contact between the reactants and the caustic so as to improve the yield.

The caustic oxidation of alcohols and aldehydes releases between about 10 and 40 volumes of gas per volume of reactants. If the reactants were introduced together at the bottom of a column or were otherwise permitted to react in a large body of liquid reactants, it is clear that the foaming problem would be very considerable and that, in any instance, the volume of reactor vessel would have to be large relative to the volume of liquids that are reacted. My method and means of introducing the reactants avoids substantially completely the problem of the evolution of large gas volumes.

Another outstanding advantage inherent in my method and apparatus is that mixtures of alcohols and aldehydes can be oxidized most efficiently, each constituent being oxidized under conditions optimum for this oxidation process. Consequently, when my apparatus is employed in the caustic oxidation of mixtures of alcohols and aldehydes, the formation of by-products is kept to a minimum. For example, the aldehydes are reacted with preheated reactants so as to avoid side reactions and the oxidation of these aldehydes is substantially completed at an optimum temperature for their oxidation before reaction conditions are altered to oxidize the alcohol.

Figure 2:
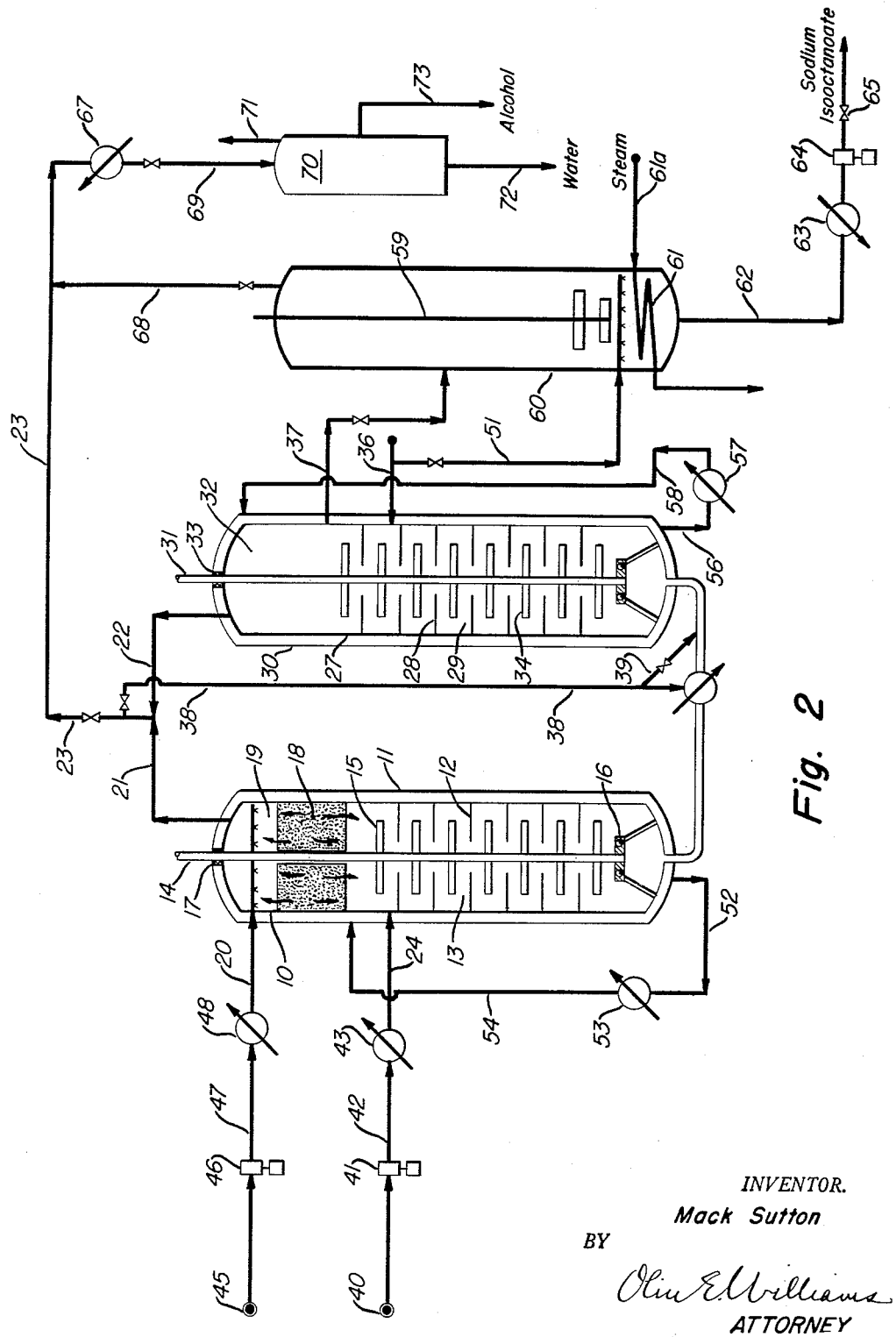

In the drawings which are supplied for the purpose of illustrating but not limiting the invention, Fig. 1 is a simplified drawing of reactor apparatus, with parts broken away, in which improved caustic oxidation is obtained, and Fig. 2 is a schematic flow diagram of a process for caustic oxidation of alcohols and aldehydes, in which the improved operating method of this invention is employed.

Referring specifically to Fig. 1, tower or column 10 is provided with an insulated or heating jacket 11 preferably containing a high temperature heat exchange fluid and is divided by horizontally extended baffles 12 into a plurality of substantially separate chambers 13 which fill the lower, approximately two-thirds of the interior volume of the column. Each of the said baffles 12 is open at its center to permit flow of fluids through the column. A vertical stirrer shaft 14 passes through the openings of the said baffles and has stirrer blades 15 which extend preferably at right angles from shaft 14 into each of the said chambers 13. The vertical shaft 14 which rests in a bearing 16 set in the base of the said column 10, engages bushing 17 and extends outside the column. The stirrer is driven by an external source of power, not shown. Disposed above the baffle-separated chambers and within column 10 is a packed section 18 which can be filled with hurdles, stoneware saddles, or other packing elements. Above the packed section is a settling, or vapor zone 19. Near the top of column 10 is a spray means 20 for the purpose of introducing hot caustic into the system. Vapors and gases from column 10 flow through line 21 and are mixed with gases from line 22, thereafter leaving the apparatus through line 23.

The uppermost baffled chamber within column 10 is provided with an inlet 24 through which preheated alcohol or aldehyde is delivered for caustic oxidation. A line 25 which extends from an outlet at the bottom of column 10, preferably contains a heater element or heat exchanger 26, and connects at its other delivery end, to the bottom of a column 27 which can be about the same size as column 10. The lower two-thirds of the interior of column 27 is also divided by baffles 28 into a series of vertically superposed connecting chambers 29. Column 27 is at least partially surrounded by an insulated shell or jacket 30 which preferably contains a high temperature heating fluid. The column 27 is provided with a stirring apparatus consisting of vertically extending shaft 31, which passes through said chambers 29 and through an upper, settling, vapor space 32 and bushing means 33, and is externally connected to a source of driving power, not shown. The vertical shaft is equipped with paddle blades 34, at least one of which extends into each of the chambers 29. A water jet means 35 may be located in the line 25 at the base of column 27 and can be employed for the introduction of small volumes of water into the reaction mass and for facilitating the introduction of the relatively viscous material from column 10 into the column 27. An upper chamber 29 in column 27 is provided also with a water inlet 36, preferably in the form of a concentric spray disposed along the wall of the column for diluting the soap reaction product and facilitating its delivery through a product outlet line 37. Vapors, primarily water and hydrogen, escape through line 22 and mix with vapors from column 10 in line 23.

A portion of the vapors flowing through line 23 can be passed through valved line 38 and be employed in heat exchanger 26. Vapors from the heat exchanger 26 can be recycled to valved line 38 or be discharged to waste through equipment not shown. A limited volume of the vapors can be introduced from valved line 38 through valved line 39 into line 25 to supply heat and water thereto, in place of water from water jet 35.

The manufacture of approximately 34,000 pounds per day of a sodium isooctanoate soap is described in connection with the flow diagram illustrated in Fig. 2. In the operation of this process, about 28,300 pounds per day of an isooctyl alcohol obtained from an Oxo synthesis is delivered from a source 40 by pump 41 and through a line 42 to a preheater 43 in which the alcohol is preheated to a temperature of about 350°–380° C., the higher temperature range being employed due to the absence of aldehyde in the feed. The heated alcohol is then delivered through inlet line 24 into the column 10 under a pressure of about 200 p. s. i. g.

Commercial caustic solution (aqueous sodium hydroxide) in approximately 73 weight percent concentration is delivered at a rate of 1160 gallons per day or 16,700 pounds per day from a source 45 by pump 46 through a line 47 and into preheater 48, wherein the caustic is heated to a temperature within the range of 350°–380° C., for example, about 375° C. Preheated caustic solution is delivered at a pressure of about 220 p. s. i. g. through line 20 into the upper, vapor chamber 19 of the column 10.

The caustic solution passes down through packing 18 and through reactor chambers 13 while being agitated and mixed with the introduced alcohol by the stirrer blades 15 which are revolved at approximately 400 R. P. M. Vapors passing upwardly through the packed section 18 concentrate the commercial caustic solution to a concentration of between about 85 and 90 weight percent. When the alcohol contains little or no aldehydes the degree of concentration of caustic obtained in packed section 18 can be slight and the water introduced with the caustic will be utilized beneficially in promoting the oxidation of alcohol.

If, however, the alcohol contains a substantial proportion of aldheydes, e. g., from 5 to 15%, it is preferable to contact the hot alcohol-aldehyde mixture with concentrated caustic. Somewhat lower temperatures, i. e. between about 175°–260° C. are used if the amount of aldehyde in the mixture is appreciable, that is above about 5%. In such case, the relative amount of packing in the packed section 18, and the temperature and rate of through-put through this section should be adjusted so as to obtain a maximum removal of water from the caustic.

The heat exchange fluid in jacket 11 of column 10 will deliver heat to the reaction zone at the rate of approximately 243,200 B. t. u. per hour. The heat exchange fluid flows from the jacket 11 through line 52 into the exchanger 53 and returns from the exchanger 53 through line 54.

If the feed stock is substantially entirely alcoholic the preheater 43 can be employed to preheat the alcohol to a temperature range of about 350°–380° C. and the reaction mixture in tower 10 can be maintained at approximately this temperature. Depending then on the constitution of the feed, reaction mixture flows from the base of column 10 at a temperature between 200° and 380° C., and at a rate of about 1,650 pounds per hour, into the bottom of column 27. The reaction mixture in column 27 is maintained at a temperature usually between about 350° and 380° C.

Heat exchange fluid in the jacket 30 delivers about 200,000 B. t. u. per hour of heat to the reaction mixture. Heat exchange fluid flows from the jacket 30 through line 56 into heat exchanger 57, and the heated fluid is returned to the jacket 30 through line 58.

Water is introduced through line 36 at a rate of about 1500 pounds per hour to improve the flowability of the soap and this product flows through valved line 37 to a stripping vessel 60 having a stirrer 59 wherein the said soap is stripped of unreacted alcohol with steam at a temperature maintained at about 220° C. by indirect heater 61 supplied with steam from steam line 61a. Water for washing the product soap is introduced into vessel 60 through valved line 51.

Isooctyl soap solution is withdrawn from vessel 60 through line 62 and cooler 63 which cools the product from about 220° C. to about 38° C. The cooled soap is pumped by pump 64 through line 65 to means (not shown) for storage, purification or direct utilization of the soap.

Vapors comprising water, hydrogen and some vaporized aldehydes or alcohol which has managed to pass through the packed section 18 will flow through line 21 and, in admixture with similar vapors from line 22, through valved line 23 to a cooler 67. Vapors from vessel 60, which vapors include primarily water and any unreacted alcohol or aldehydes, flow through valved line 68 through said line 23 to the cooler 67. The vapors are cooled in cooler 67 from a temperature of about 220° C. to 30° C. The improved reactor, having numerous reactor chambers 13 and 29 and a packed section to provide caustic scrubbing of product gases, provides substantially complete elimination of alchol loss from the reactor. However, sufficient alcohol may be present in the product gases to warrant passing the hydrogen and condensed water and alcohol from the cooler 67 through the valved line 69 into a separator 70. The hydrogen will escape from separator 70 at a rate of about 103 cubic feet per minute through vent 71. The waste water can be withdrawn through a line 72, and the alcohol can be decanted through a line 73, but preferably is recycled to product inlet line 24 or 42.

The described process will produce about 34,200 pounds of sodium isooctonoate per day. The product will contain at this point about 0.1% alcohol and 38% water based on the weight of the total product. Numerous methods can be employed to dry and purify the soap product.

Having described my invention, I claim:

1. The method of effecting caustic oxidation of an oxygen-containing aliphatic organic reactant selected from the class consisting of alcohols, aldehydes and mixtures thereof which method comprises introducing preheated caustic near the top of a reaction zone at a temperature within the range of 350°–380° C., introducing a hot liquid oxygen-containing aliphatic organic reactant of the class consisting of alcohols, aldehydes and mixtures thereof at a lower level in said reaction zone, maintaining said reaction zone at a pressure in the range of about atmospheric to about 500 p. s. i. g. and at temperatures in the range of 350°–380° C., intimately mixing introduced reactant caustic and liquid oxygen-containing aliphatic organic reactant while passing said reactants from substantially the level of oxygen-containing reactant inlet to the bottom of said reaction zone whereby said caustic reacts with said oxygen-containing reactant and a gas is liberated chiefly at substantially the level of oxygen-containing aliphatic organic reactant inlet and in lesser amounts below said inlet, and countercurrently contacting said gas with said caustic in the zone between the levels at which hot caustic and hot oxygen-containing aliphatic organic reactant are introduced to said reaction zone.

2. The method of claim 1 wherein the caustic is introduced to said reaction zone as a preheated aqueous solution of said caustic, and wherein said aqueous solution of caustic is concentrated with respect to caustic content by the stripping action of said liberated gas.

3. The method of claim 2 wherein the aqueous solution of caustic is an aqueous solution of sodium hydroxide.

4. The method of claim 1 wherein the oxygen-containing aliphatic organic reactant consists essentially of a mixture of alcohols and aldehydes having from 4 to 16 carbon atoms per molecule, said alcohols being present in major amount in said mixture.

5. A method for the production of a sodium soap of an aliphatic organic acid containing from 4 to 16 carbon atoms per molecule which method comprises introducing at least one liquid, oxygen-containing compound selected from the class consisting of aliphatic aldehydes and aliphatic alcohols having from 4 to 16 carbon atoms per molecule and mixtures thereof at a temperature of about 200° to about 380° C. at an upper level to a vertical reaction zone, introducing sodium hydroxide at a temperature in the temperature range of 350°–380° C., at a substantially higher level in said reaction zone, intimately and countercurrently contacting ascending gases and vapors released in said reaction zone substantially at the level of introduction of said oxygen-containing compound to the reaction zone with downwardly flowing sodium hydroxide to scrub vapors of at least one oxygen-containing aliphatic organic compound from said ascending gases and vapors, concurrently flowing the reaction mixture of sodium hydroxide and at least one oxygen-containing aliphatic organic compound downwardly through the lower part of the reaction zone while maintaining the reaction mixture within the temperature range of 350° to 380° C., and at a pressure of atmospheric to 500 p. s. i. g., stirring the downflowing reaction mixture and withdrawing sodium soap product from the bottom of said reaction zone.

6. A continuous method for the production of an alkali metal soap of an aliphatic organic acid by the caustic oxidation of at least one liquid, oxygenated aliphatic organic compound selected from the class consisting of alcohols, aldehydes and mixtures of alcohols and aldehydes which method comprises the steps of (1) introducing said at least one liquid oxygenated aliphatic organic compound at a temperature in the range of about 200° to 380° C., at an upper level in a first vertical reaction zone, (2) introducing an aqueous solution of an alkali metal hydroxide selected from the class of sodium hydroxide and potassium hydroxide at a temperature in the range of about 175° C. to about 380° C., at a substantially higher level in said reaction zone, (3) intimately contacting in the part of the reaction zone between the level of introduction of hydroxide and the level of introduction of oxygenated organic compound, downflowing alkali metal hydroxide solution of step 2 with the mixture of gases and vapors, produced in part by reaction of said alkali metal hydroxide solution with said liquid oxygenated aliphatic organic compound and in part by vaporization of a part of said liquid oxygenated aliphatic organic compound, to simultaneously scrub oxygenated liquid organic compound vapors from the mixture of gases and vapors and strip water from said alkali metal hydroxide solution, (4) continuously flowing the reaction mixture of concentrated hydroxide solution and liquid oxygenated aliphatic compound downwardly through the lower part of the reaction zone at a temperature within said temperature range and stirring said reaction mixture to maintain the reactants in intimate contact to form a reaction mixture containing alkali metal soap and unreacted reactants, (5) passing the soap-containing reaction mixture of step 4 from the bottom of said reaction zone upwardly into a second reaction zone and maintaining said reaction mixture at a temperature within the range of from about 350° C. to about 380° C. to cause continuation of the reaction of unreacted aqueous solution of alkali metal hydroxide with unreacted oxygenated aliphatic organic compound, and (6) withdrawing product soap from said second reaction zone.

7. The method as described in claim 6 wherein the liquid oxygenated aliphatic compound is a mixture of aliphatic aldehydes and aliphatic alcohols and the alkali metal hydroxide solution is sodium hydroxide solution.

8. The method as described in claim 7 wherein the mixture of aliphatic aldehydes and aliphatic alcohols with hydroxide solution is maintained at a temperature in the range of 200° C. to about 260° C. in the first reaction zone.

9. The method of claim 6 wherein water is introduced into the reaction mixture passing into the second reaction zone.

10. In a process for the production of at least one alkali metal soap wherein a preheated aqueous solution of at least one alkali metal hydroxide is reacted with at least one preheated liquid oxygenated organic compound selected from the class of aliphatic alcohols, aliphatic aldehydes and mixtures of aliphatic alcohols with aliphatic aldehydes in a reaction zone at a temperature within the range of about 175° to about 380° C. to produce a reaction mixture containing unreacted liquid oxygenated organic compound, aqueous alkali hydroxide solution and said alkali metal soap and whereby an effluent gaseous mixture containing hydrogen and vaporized oxygenated organic compound is produced in said reaction zone the improvement which consists of countercurrently contacting said gaseous mixture with said preheated aqueous solution of alkali metal hydroxide at a level above the level of said reaction mixture in said reaction zone to scrub said vaporized oxidized organic compound from said gaseous mixture and simultaneously strip water from said aqueous solution of alkali metal hydroxide.

References Cited in the file of this patent

UNITED STATES PATENTS

| | | |
|---|---|---|
| 1,251,533 | Jenssen | Jan. 1, 1918 |
| 1,576,705 | Babcock | Mar. 16, 1926 |
| 1,926,068 | Strosacker et al. | Sept. 12, 1933 |
| 2,257,533 | Reich | Sept. 30, 1941 |
| 2,384,817 | Chitwood | Sept. 18, 1945 |